(12) United States Patent
Zamanzadeh et al.

(10) Patent No.: US 11,598,714 B1
(45) Date of Patent: Mar. 7, 2023

(54) ALTERNATING CURRENT INTERFERENCE CORROSION DETECTOR

(71) Applicant: MATERGENICS, INC., Pittsburgh, PA (US)

(72) Inventors: Mehrooz Zamanzadeh, Pittsburgh, PA (US); Anil Kumar S. Chikkam, Pittsburgh, PA (US)

(73) Assignee: Matergenics, Inc., Pittsburgh, PA (US)

( * ) Notice: Subject to any disclaimer, the term of this patent is extended or adjusted under 35 U.S.C. 154(b) by 0 days.

(21) Appl. No.: 17/833,722

(22) Filed: Jun. 6, 2022

Related U.S. Application Data (60) Provisional application No. 63/211,762, filed on Jun. 17, 2021.

(51) Int. Cl.
*G01N 17/04* (2006.01)
*G01N 17/00* (2006.01)

(52) U.S. Cl.
CPC ......... *G01N 17/043* (2013.01); *G01N 17/006* (2013.01)

(58) Field of Classification Search
CPC .................... G01N 17/004; G01N 17/043
See application file for complete search history.

(56) References Cited

U.S. PATENT DOCUMENTS

| | | | | |
|---|---|---|---|---|
| 6,843,135 | B2 * | 1/2005 | Douglas | G01N 17/046 73/810 |
| 8,154,279 | B1 | 4/2012 | Zamanzadeh | |
| 11,085,908 | B1 | 8/2021 | Zamanzadeh | |
| 2008/0036476 | A1 * | 2/2008 | Nielsen | G01N 17/02 324/700 |
| 2014/0225631 | A1 * | 8/2014 | Kajiyama | G01N 17/043 324/700 |
| 2015/0362423 | A1 * | 12/2015 | Panossian | G01N 17/043 324/700 |
| 2017/0160237 | A1 * | 6/2017 | Freer | G01N 27/9073 |
| 2020/0378885 | A1 * | 12/2020 | Yang | G01N 17/04 |

FOREIGN PATENT DOCUMENTS

| | | | | |
|---|---|---|---|---|
| CA | 2754181 A1 * | 9/2010 | | G01N 17/04 |
| EP | 1598446 A2 * | 11/2005 | | C23F 13/04 |
| JP | 2009020058 A * | 1/2009 | | |

OTHER PUBLICATIONS

Simon, Philip and McCaffery, John, "Excavation, Removal and Evaluation of Coupons Exposed to AC Interference While Connected to an Operating Product Transmission Pipeline", Corrosion 2021, Paper No. 16566, Apr. 9-30, 2021.

* cited by examiner

*Primary Examiner* — Natalie Huls
(74) *Attorney, Agent, or Firm* — Thomas M. Joseph, Esq (57) ABSTRACT

A non-destructive testing apparatus generates an electric current in a test coupon that is adjacent to the metallic structure. The non-destructive testing apparatus measures the electric current to produce at least one electric current measurement. The non-destructive testing apparatus correlates the at least one electric current measurement with the quantity of a predetermined iron oxide in the test coupon to determine a proxy for the degree of alternating current interference corrosion in the metallic structure.

20 Claims, 5 Drawing Sheets

| 201 | INDUCE AN ELECTRIC CURRENT IN A TEST COUPON THAT IS ADJACENT TO THE METALLIC STRUCTURE |

↓

| 202 | MEASURE THE ELECTRIC CURRENT TO PRODUCE A PLURALITY OF ELECTRIC CURRENT MEASUREMENTS |

↓

| 203 | CONVERT THE ELECTRIC CURRENT MEASUREMENTS INTO DATA FOR PROCESSING BY THE COMPUTER SYSTEM |

↓

| 204 | DETERMINE THE AMOUNT OF IRON OXIDE IN THE TEST COUPON |

ALTERNATING CURRENT INTERFERENCE CORROSION DETECTOR

CROSS REFERENCE TO RELATED APPLICATION

This application claims the benefit under 35 U.S.C. § 119(e) of U.S. Provisional Application No. 63/211,762 entitled "ALTERNATING CURRENT INTERFERNCE CORROSION DETECTOR" filed Jun. 17, 2021, which is incorporated herein by reference.

BACKGROUND

The placement of Alternating Current (AC) power lines close to pipelines, such as natural gas pipelines, can be the source of a phenomenon known as AC interference corrosion. AC interference corrosion occurs when the power lines induce a current in the pipelines. The industry standard for AC mitigation on pipelines is to maintain voltage gradient (step-touch potential) below 15 VAC power.

Pipelines collocated in a right-of-way (ROW) with AC power lines, paralleling at a distance, or crossing power line ROWs can be subject to AC interference. AC current induced on a pipeline may cause severe corrosion damage. Current from AC fault events may damage pipeline coatings, burn isolation devices or melt metal in extreme cases.

Those tasked with maintaining pipelines require an in-depth understanding of the locations where pipelines are at risk of AC interference corrosion. Many factors are associated with increased AC interference corrosion risk. These factors include soil resistivity, coating condition, cathodic protection levels, co-location length, crossing angle and separation distance.

Traditional indirect assessment tools may be inadequate in identifying areas at risk for AC corrosion. Accordingly, there is a need for improved methods and systems for detecting AC interference corrosion.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a method for using a non-destructive testing apparatus to detect alternating current interference corrosion in a metallic structure is provided. The non-destructive testing apparatus includes an inductor, a sensor, a computer system having a processor thereon, and a converter for coupling the sensor to the computer system. The inductor induces an electric current in a test coupon that is adjacent to the metallic structure. The sensor measures the electric current to produce a plurality of electric current measurements. The converter converts the electric current measurements into data for processing by the computer system. The computer system determines the amount of iron oxide in the test coupon. The amount of iron oxide that is present in the test coupon is an indicator of the degree of alternating current interference corrosion in the metallic structure.

In other implementations, a method for using a non-destructive testing apparatus to detect alternating current interference corrosion in a metallic structure is provided. The non-destructive testing apparatus generates an electric current in a test coupon that is adjacent to the metallic structure. The non-destructive testing apparatus measures the electric current to produce at least one electric current measurement. The non-destructive testing apparatus correlates the at least one electric current measurement with the quantity of a predetermined iron oxide in the test coupon to determine a proxy for the degree of alternating current interference corrosion in the metallic structure.

In yet other implementations, a system for monitoring alternating current interference corrosion in a metallic structure is provided. The system includes a test coupon adjacent to the metallic structure and a non-destructive testing apparatus having an inductor, a sensor, a computer system having a processor thereon, and a converter for coupling the sensor to the computer system. The inductor induces an electric current in the test coupon. The sensor measures the electric current to produce a plurality of electric current measurements. The converter converts the electric current measurements into data for processing by the computer system. The computer system determines the amount of ferrimagnetic iron oxide in the test coupon to derive the degree of alternating current interference corrosion in the metallic structure.

The system for monitoring alternating current interference corrosion in a metallic structure can be provided as a kit.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The subject disclosure is directed to systems, methods, and apparatus for detecting AC interference corrosion and, more particularly, to a non-destructive testing device for detecting AC interference corrosion in pipelines. The device can include an inductor, a sensor, a computer system having a processor thereon, and a converter for coupling the sensor to the computer system.

The inductor can induce an electric current in a test coupon that is adjacent to the pipeline. The sensor can measure the electric current to produce a plurality of electric current measurements that can be correlated to the presence of a particular iron oxide in the test coupon. The amount of the iron oxide that is present in the test coupon is an indicator of the degree of alternating current interference corrosion in the metallic structure.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
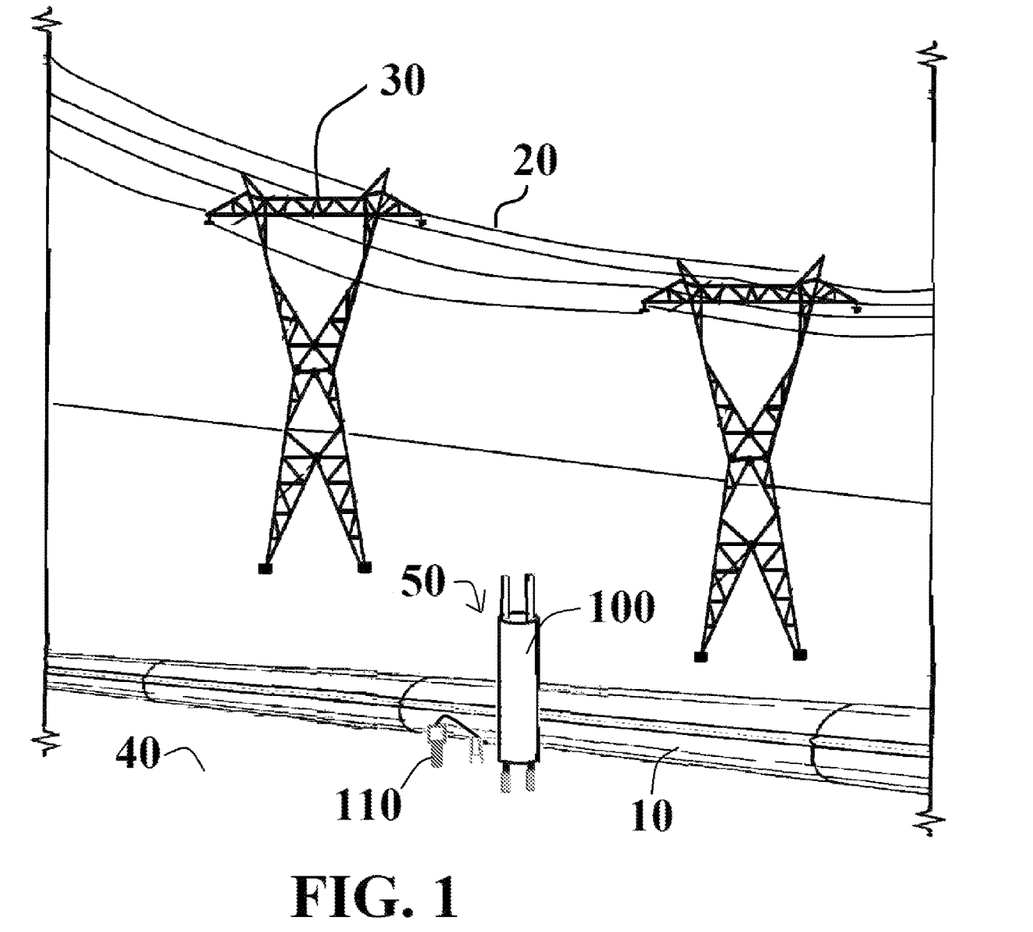
FIG. 1 is a schematic diagram of an alternating current interference corrosion detector in accordance with the subject disclosure.
Figure 2:
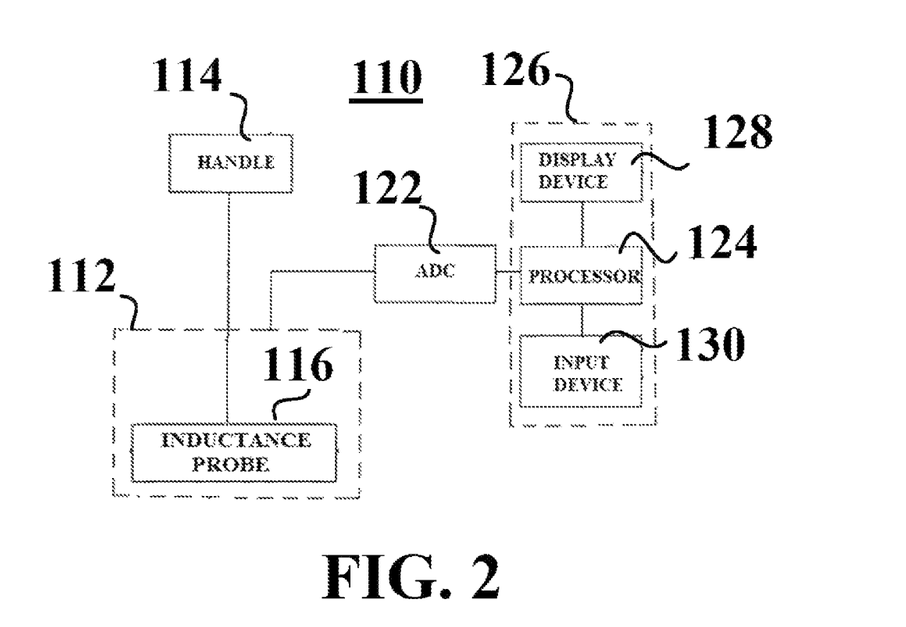
FIG. 2 is a block diagram of a non-destructive testing apparatus that can be used with the alternating current interference corrosion detector shown in FIG. 1.
Figure 3:
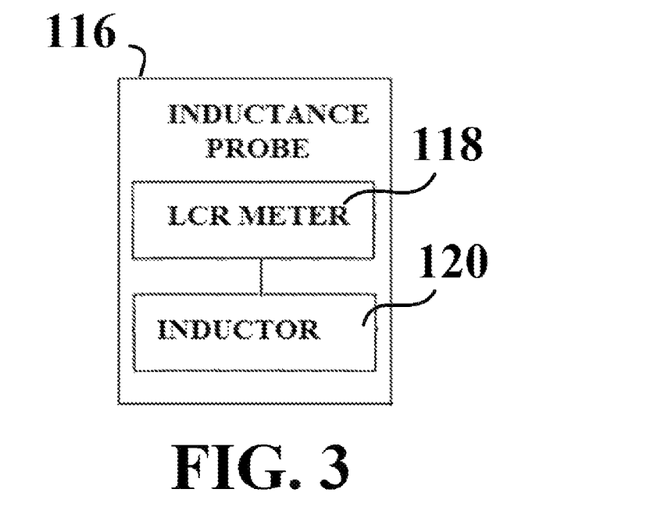
FIG. 3 is a block diagram of a probe that can be used with the apparatus shown in FIG. 2.

Referring to the drawings and, in particular, to FIGS. 1-3, there is shown a pipeline 10 that is located near high voltage power lines 20. The power lines 20 are supported by towers 30. When the high voltage power lines 20 include phase conductors that carry AC current, an electromotive force (EMF) is induced on all nearby structures including the pipeline 10, even when the pipeline 10 is buried in the ground 40.

The higher the AC current in the power lines 20 become, the more AC current is induced in the pipeline 10, which increases the touch potential between the pipeline 10 and the ground 40 (or, in the case of a buried pipeline, the surrounding earth).

When the AC current density in the pipeline 10 exceeds a certain threshold, the AC interference corrosion will occur. The threshold is generally believed to be 30 $A/m^2$. However, AC interference corrosion has been observed when the threshold has been as low as 5 $A/m^2$.

Pipelines 10 are, generally, constructed from metallic materials and, in particular, ferrous alloys. The pipeline 10 can include a coupon test station 50 that holds one or more test coupons 100 that can be used to detect AC interference corrosion in the metallic material. Specifically, the test coupons 100 can be tested for the presence of certain iron oxides using a non-destructive testing apparatus 110 that has the ability to identify magnetic properties of the materials in the test coupons 100. The iron oxides can ferrimagnetic iron oxides, such as magnetite.

The non-destructive testing apparatus 110 can generate an electric current in the test coupons 100. The non-destructive testing apparatus 110 can measure the electric current to produce electric current measurements on a continuous basis. The measurements can be correlated to the quantity of iron oxides in the test coupons 100 to determine a proxy for the degree of alternating current interference corrosion in the pipeline 10.

As shown in FIGS. 2-3, the non-destructive testing apparatus 110 can include a tubular housing or wand 112 and a handle 114. The housing 112 can hold an inductance probe assembly 116 that holds an LCR meter 118 and a magnet 120. The magnet 120 can be any suitable magnet, such as a permanent magnet or an electromagnet. The LCR meter 118 can function as a sensor.

The handle 114 extends from the housing 112 to facilitate manual manipulation, mechanical manipulation, and/or electro-mechanical manipulation to allow the measurement of the corrosion by measuring electric current at various locations along the pipeline 10 and, specifically, on test coupons 100 adjacent to the pipeline 10.

The housing 112 and the handle 114 are made from any suitable materials by any suitable manufacturing process. Preferably, the housing 112 and the handle 114 are made from non-ferrous materials.

The magnet 120 can function as a magnetic field generator and/or an inductor that can induce an electric current in the test coupons 100. The current can be detected with the sensor 120. The sensor 120 can measure the inductance of the inductor or magnet 120, so that the sensor 120 that can obtain magnetic property measurements that relate to the intensity of the induced current within the test coupons 100. In some embodiments, the sensor 120 can be calibrated to make certain magnetic property measurements, such as magnetic permeability measurements, magnetic force measurements, and/or magnetic flux density measurements.

The sensor 120 sends the current measurements to a converter 122. In this exemplary embodiment, the converter 122 is an analog-to-digital converter (ADC).

The converter 122 can convert the current measurements into data for processing by a processor 124 within a computer system 126. The processor 124 can send the current data to a display device 128 for output and, optionally, to a storage device (not shown) for logging. The processor 124 can refine the output for display on the display device 128.

The computer system 126 is a suitable microcontroller, laptop computer, personal computer, network computer, or other computing device. The computer system 126 utilizes the processor 124 to implement custom software to perform data collection, potentiometer monitoring, and user interface functions. The computer system 126 can include an internal memory device (not shown).

The computer system 126 has the ability to receive input through a keypad or other input device 130 for processing by the processor 124. The processor 124 also has the ability to send output to the display device 128. The processor 124 converts the current measurements into a suitable data structure or form for output to the display device 128.

The processor 124 receives data from the sensor 120. The data can be displayed on the display device 128 in its raw form or can be used to calculate the degree of corrosion that has occurred in the test coupons 100 in appropriate units, which can be used to predict the amount of corrosion that has occurred in the pipeline 10. It should be understood that the non-destructive testing apparatus 110 can measure the corrosion in the pipeline 10 directly in some embodiments.

In some embodiments, the non-destructive testing apparatus 110 can be implemented as a modified version of the device disclosed in U.S. Pat. No. 8,154,279 to Zamanzadeh et. al. and/or as one of the devices disclosed in in U.S. patent application Ser. No. 16/999,151 to Zamanzadeh et. al. In such embodiments, the device must be re-configured and calibrated to measure for the presence of magnetite in the test coupons.

Exemplary Processes

Figure 4:
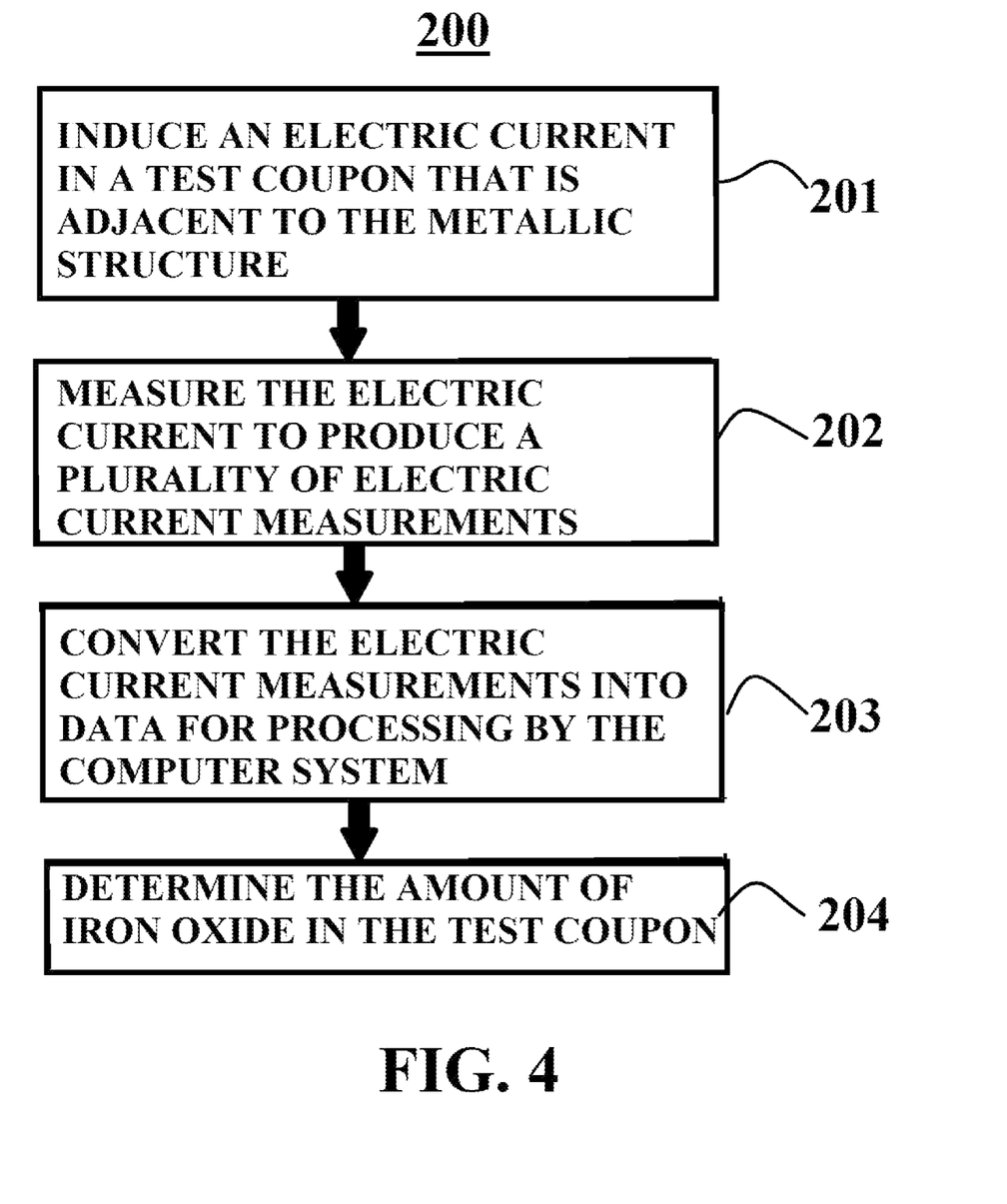
FIG. 4 is an exemplary process in accordance with the subject disclosure.

Referring now to FIG. 4 with continuing reference to the foregoing figures, an exemplary method, generally designated with the numeral 200, for detecting AC interference corrosion in pipelines and other similar metallic structures is shown. In this exemplary embodiment, the method 200 can be performed using the test coupons 100 and the non-destructive testing apparatus 110 shown in FIGS. 1-3.

The non-destructive testing apparatus can include an inductor, a sensor, a computer system having a processor thereon, and a converter for coupling the sensor to the computer system.

At 201, the inductor induces an electric current in a test coupon that is adjacent to the metallic structure. In this exemplary embodiment, the inductor is the inductor 120 shown in FIG. 3.

At 202, the sensor measures the electric current to produce a plurality of electric current measurements. In this exemplary embodiment, the sensor is the LCR meter 118 shown in FIG. 3.

At 203, the converter converts the electric current measurements into data for processing by the computer system. In this exemplary embodiment, the converter is the analog-to-digital converter 122 shown in FIG. 2

At 204, the computer system determines the amount of iron oxide in the test coupon. The amount of iron oxide that is present in the test coupon is an indicator of the degree of alternating current interference corrosion in the metallic structure. In this exemplary embodiment, the computer system is the computer system 126 shown in FIG. 2.

Figure 5:
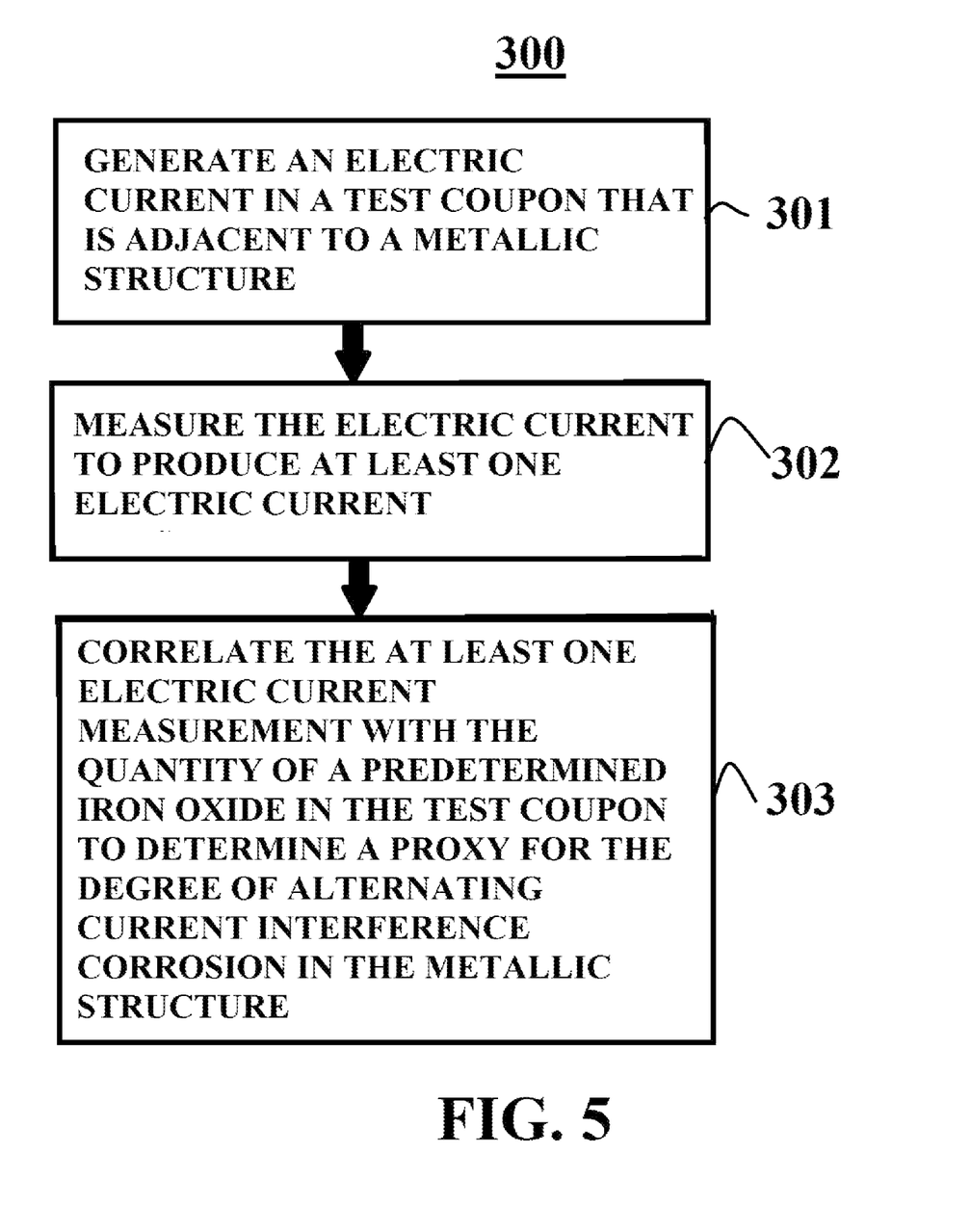
FIG. 5 is an exemplary process in accordance with the subject disclosure.

Referring now to FIG. 5 with continuing reference to the foregoing figures, another exemplary method, generally designated with the numeral 300, for detecting AC interference corrosion in pipelines and other similar metallic structures is shown. In this exemplary embodiment, the method 300 can be performed using the test coupons 100 and the non-destructive testing apparatus 110 shown in FIGS. 1-3.

At 301, the non-destructive testing apparatus generates an electric current in a test coupon that is adjacent to the metallic structure. In this exemplary embodiment, the non-destructive testing apparatus generates the current using the inductor 120 shown in FIG. 3.

At 302, the non-destructive testing apparatus measures the electric current to produce at least one electric current measurement. In this exemplary embodiment, the non-destructive testing apparatus measures the current using the LCR meter 118 shown in FIG. 3.

At 303, the non-destructive testing apparatus correlates the at least one electric current measurement with the quantity of a predetermined iron oxide in the test coupon to determine a proxy for the degree of alternating current interference corrosion in the metallic structure. In this exemplary embodiment, the non-destructive testing apparatus correlates the electric current measurements with the quantity of the predetermined iron oxide using the computer system 126 shown in FIG. 2.

Exemplary Computer Systems

Figure 6:
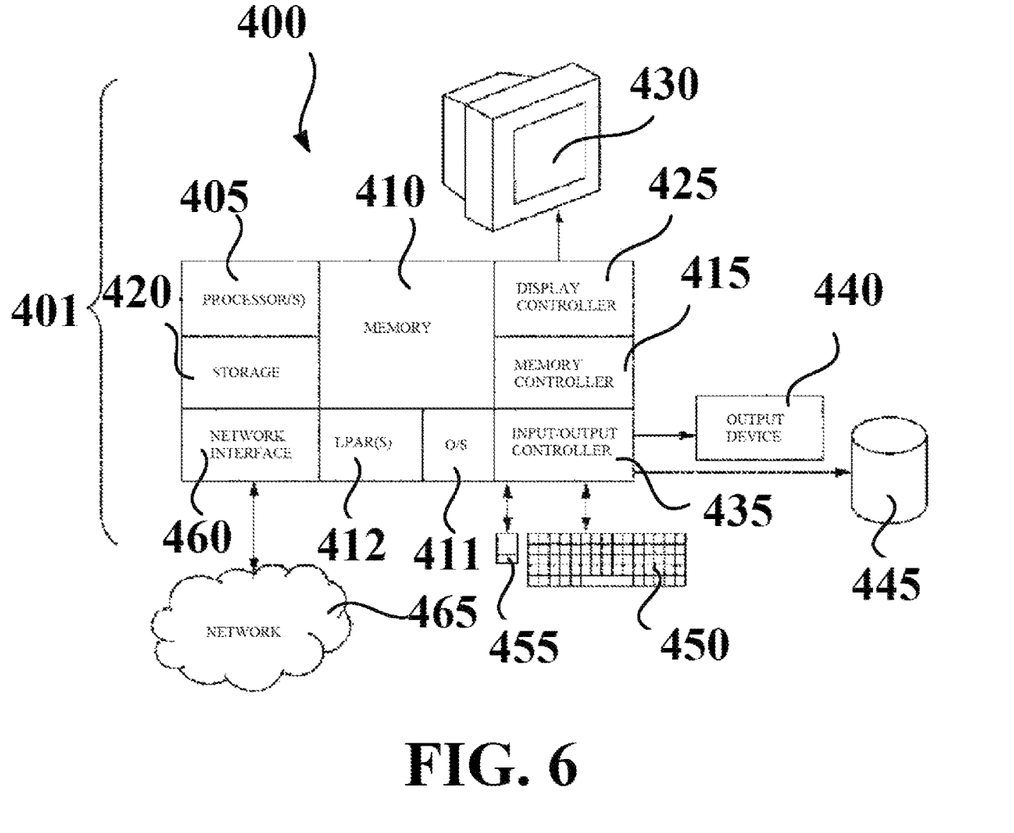
FIG. 6 is a schematic diagram for a computer system for implementing the subject matter of the subject disclosure.

Referring now to FIG. 6 with continuing reference to the forgoing figures, a computer system for generating and displaying output for a non-destructive testing system is generally shown according to one or more embodiments. The non-destructive testing system is particularly adapted for detecting the graphitization of an iron sample and, more specifically, for detecting AC interference corrosion in pipelines.

The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore can include general-purpose computer 401 capable of running multiple instances of an O/S simultaneously.

In an exemplary embodiment, in terms of hardware architecture, as shown in FIG. 6, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 can have additional elements, which are omitted for simplicity, such as controllers, buffers (caches), drivers, repeaters, and receivers, to enable communications. Further, the local interface can include address, control, and/or data connections to enable appropriate communications among the aforementioned components. The input/output controller 435 can include a plurality of sub-channels configured to access the output devices 440 and 445. The sub-channels can include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 can incorporate electronic, magnetic, optical, and/or other types of storage media. Note that the memory 410 can have a distributed architecture, where various components are situated remote from one another, but can be accessed by the processor 405.

The instructions in memory 410 can include one or more separate programs, each of which comprises an ordered listing of executable instructions for implementing logical functions. In the example of FIG. 6, the instructions in the memory 410 can be executed by a suitable operating system (OS) 411. The operating system 411 essentially controls the execution of other computer programs and provides scheduling, input-output control, file and data management, memory management, and communication control and related services.

The memory 410 can include multiple logical partitions (LPARs) 412, each running an instance of an operating system. The LPARs 412 can be managed by a hypervisor, which can be a program stored in memory 410 and executed by the processor 405.

In an exemplary embodiment, a conventional keyboard 450 and mouse 455 can be coupled to the input/output controller 435. Other output devices such as the I/O devices 440, 445 can include input devices, for example but not limited to a printer, a scanner, microphone, and the like. Finally, the I/O devices 440, 445 can further include devices that communicate both inputs and outputs, for instance but not limited to, a network interface 460 card (NIC) or modulator/demodulator (for accessing other files, devices, systems, or a network 465), a radio frequency (RF) or other transceiver, a telephonic interface, a bridge, a router, and the like. The system 400 can further include a display controller 425 coupled to a display 430.

If the computer 401 is a PC, workstation, intelligent device or the like, the instructions in the memory 410 can further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In accordance with one or more embodiments described herein, the computer 401 can implement and/or perform the disclosed subject matter. As shown, computer 401 can include instructions in memory 410 for performing and/or controlling Step 204 shown in FIG. 4 and/or Step 303 shown in FIG. 5. The computer system 126 shown in FIG. 2 can be implemented as the computer 401 shown in FIG. 6 with the display device 128 shown in FIG. 2 being implemented as the display 430 shown in FIG. 6.

The disclosed subject matter can be implemented as a system, a method, and/or a computer program product at any possible technical detail level of integration. The computer program product can include a computer readable storage medium (or media) having computer readable program instructions thereon for causing a processor to carry out embodiments and features of the subject disclosure. Additionally, the system can be implemented within a cloud environment.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to exploit features of the present disclosure.

Embodiments and features of the subject disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the subject disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

SUPPORTED FEATURES AND EMBODIMENTS

The detailed description provided above in connection with the appended drawings explicitly describes and supports various features of apparatus and methods for detecting alternating current interference corrosion. By way of illustration and not limitation, supported embodiments include a method for using a non-destructive testing apparatus to detect alternating current interference corrosion in a metallic structure, wherein the non-destructive testing apparatus includes an inductor, a sensor, a computer system having a processor thereon, and a converter for coupling the sensor to the computer system, the method comprising: inducing, with the inductor, an electric current in a test coupon that is adjacent to the metallic structure, measuring, with the sensor, the electric current to produce a plurality of electric current measurements, converting, with the converter, the electric current measurements into data for processing by the computer system, and determining, with the computer system, the amount of iron oxide in the test coupon, whereby the amount of iron oxide that is present in the test coupon is an indicator of the degree of alternating current interference corrosion in the metallic structure.

Supported embodiments include the foregoing method, further comprising: correlating the amount of iron oxide that is present in the test coupon to the degree of alternating current interference corrosion in the metallic structure.

Supported embodiments include any of the foregoing methods, further comprising: comparing each of the plurality of electric current measurements to a calibration standard to quantify the amount of iron oxide in the test coupon.

Supported embodiments include any of the foregoing methods, further comprising: comparing the amount of iron oxide in the test coupon to a calibration standard to quantify the degree of alternating current interference corrosion in the metallic structure.

Supported embodiments include any of the foregoing methods, further comprising: generating output relating to the degree of alternating current interference corrosion in the metallic structure Supported embodiments include any of the foregoing methods, further comprising: generating output that includes a representation of the amount of iron oxide that is present in the test coupon.

Supported embodiments include any of the foregoing methods, further comprising: generating output that includes a numerical representation of the quantity of iron oxide that is present in the test coupon.

Supported embodiments include any of the foregoing methods, further comprising: sending the output to a display device.

Supported embodiments include any of the foregoing methods, wherein the iron oxide is a ferrimagnetic iron oxide.

Supported embodiments include any of the foregoing methods, wherein the ferrimagnetic iron oxide is magnetite.

Supported embodiments include any of the foregoing methods, further comprising: contacting the test coupon with the sensor.

Supported embodiments include any of the foregoing methods, further comprising: bringing the sensor within close proximity to the test coupon before performing the measuring step.

Supported embodiments include a kit, an apparatus, a system, and/or means for implementing any of the foregoing methods or a portion thereof.

Supported embodiments include a method for using a non-destructive testing apparatus to detect alternating current interference corrosion in a metallic structure, generating, with the non-destructive testing apparatus, an electric current in a test coupon that is adjacent to the metallic structure, measuring, with the non-destructive testing apparatus, the electric current to produce at least one electric current measurement, and correlating, with the non-destructive testing apparatus, the at least one electric current measurement with the quantity of a predetermined iron oxide in the test coupon to determine a proxy for the degree of alternating current interference corrosion in the metallic structure.

Supported embodiments include the foregoing method, further comprising: sending output relating to the degree of alternating current interference corrosion in the metallic structure to a display device.

Supported embodiments include any of the foregoing methods, wherein the output includes a representation of the amount of the predetermined iron oxide that is present in the test coupon.

Supported embodiments include any of the foregoing methods, wherein the output includes a numerical representation of the quantity of the predetermined iron oxide that is present in the test coupon.

Supported embodiments include any of the foregoing methods, wherein the predetermined iron oxide is a ferrimagnetic iron oxide.

Supported embodiments include any of the foregoing methods, wherein the ferrimagnetic iron oxide is magnetite.

Supported embodiments include any of the foregoing methods, wherein the correlating step includes relating a magnetic property of the test coupon to the quantity of predetermined iron oxide in the test coupon.

Supported embodiments include a kit, an apparatus, a system, and/or means for implementing any of the foregoing methods or a portion thereof.

Supported embodiments include a system for monitoring alternating current interference corrosion in a metallic structure, the system comprising: a test coupon adjacent to the metallic structure, and a non-destructive testing apparatus including an inductor, a sensor, a computer system having a processor thereon, and a converter for coupling the sensor to the computer system, wherein the inductor induces an electric current in the test coupon, wherein the sensor measures the electric current to produce a plurality of electric current measurements, wherein the converter converts the electric current measurements into data for processing by the computer system, and wherein the computer system determines the amount of ferrimagnetic iron oxide in the test coupon to derive the degree of alternating current interference corrosion in the metallic structure.

Supported embodiments include the foregoing system, further comprising: a display device for receiving output from the computer system that relates to the degree of alternating current interference corrosion in the metallic structure. Supported embodiments include a kit, an apparatus, a method, and/or means for implementing any of the foregoing systems or a portion thereof.

Supported embodiments include a kit for monitoring alternating current interference corrosion in a metallic structure, the kit comprising: a test coupon adjacent to the metallic structure, and a non-destructive testing apparatus including an inductor, a sensor, a computer system having a processor thereon, and a converter for coupling the sensor to the computer system, wherein the inductor can induce an electric current in the test coupon, wherein the sensor can measure the electric current to produce a plurality of electric current measurements, wherein the converter can convert the electric current measurements into data for processing by the computer system, and wherein the computer system can determine the amount of ferrimagnetic iron oxide in the test coupon to derive the degree of alternating current interference corrosion in the metallic structure.

Supported embodiments can provide various attendant and/or technical advantages in terms of providing an improved method and/or system for measuring AC interference corrosion in metallic structures by using the presence of magnetite as an indicator of the degree of corrosion that has occurred.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A method for using a non-destructive testing apparatus to detect alternating current interference corrosion in a nearby underground metallic structure,
   wherein the non-destructive testing apparatus includes an inductor, a sensor, a computer system having a processor thereon, and a converter for coupling the sensor to the computer system, and
   wherein the sensor is a magnetic property sensor selected from the group consisting of a magnetic permeability sensor, a magnetic force sensor, and a magnetic flux density sensor, the method comprising:
   placing a test coupon in an area adjacent to the underground metallic structure,
   inducing, with the inductor, an induced electric current in the test coupon that is adjacent to the underground metallic structure,
   measuring, with the magnetic property sensor, magnetic properties for the test coupon,
   correlating, with the computer system, an amount of iron oxide in the test coupon with the magnetic properties, and
   calculating, with the computer system, the degree of alternating current interference corrosion in the underground metallic structure based on the amount of iron oxide in the test coupon.

2. The method of claim 1, further comprising:
   comparing magnetic properties to a calibration standard to quantify the amount of iron oxide in the test coupon.

3. The method of claim 1, further comprising:
   comparing the amount of iron oxide in the test coupon to a calibration standard to quantify the degree of alternating current interference corrosion in the underground metallic structure.

4. The method of claim 1, further comprising:
   generating output relating to the degree of alternating current interference corrosion in the underground metallic structure.

5. The method of claim 4, further comprising:
   generating output that includes a representation of the amount of iron oxide that is present in the test coupon.

6. The method of claim 5, further comprising:
   generating output that includes a numerical representation of the quantity of iron oxide that is present in the test coupon.

7. The method of claim 4, further comprising:
   sending the output to a display device.

8. The method of claim 1, wherein the iron oxide is a ferrimagnetic iron oxide.

9. The method of claim 8, wherein the ferrimagnetic iron oxide is magnetite.

10. The method of claim 1, further comprising:
    contacting the test coupon with the sensor.

11. The method of claim 1, further comprising:
    bringing the sensor within close proximity to the test coupon before performing the measuring step.

12. The method of claim 1, wherein the magnetic property sensor is a magnetic flux sensor selected from the group consisting of a Hall effect sensor, a giant magneto resistance sensor, a sense coil sensor, a pickup coil sensor, and a Faraday effect-based optical sensor.

13. A method for using a non-destructive testing apparatus to detect alternating current interference corrosion in a nearby underground metallic structure, comprising:

placing a test coupon adjacent to the underground metallic structure, inducing, with the non-destructive testing apparatus, an electric current in a the test coupon that is adjacent to the underground metallic structure, measuring, with a magnetic property sensor, a magnetic property of the test coupon selected from the group consisting of magnetic permeability, magnetic force, and/or magnetic flux density to obtain a measured magnetic property based upon the intensity of the electric current, and correlating, with the non-destructive testing apparatus, the measured magnetic property with the quantity of a predetermined iron oxide in the test coupon to determine a proxy for the degree of alternating current interference corrosion in the underground metallic structure.

14. The method of claim 13, further comprising:

sending output relating to the degree of alternating current interference corrosion in the underground metallic structure to a display device.

15. The method of claim 14, wherein the output includes a representation of the amount of the predetermined iron oxide that is present in the test coupon.

16. The method of claim 15, wherein the output includes a numerical representation of the quantity of the predetermined iron oxide that is present in the test coupon.

17. The method of claim 13, wherein the predetermined iron oxide is a ferrimagnetic iron oxide.

18. The method of claim 17, wherein the ferrimagnetic iron oxide is magnetite.

19. The method of claim 13, wherein the magnetic property sensor is a magnetic flux sensor selected from the group consisting of a Hall effect sensor, a giant magneto resistance sensor, a sense coil sensor, a pickup coil sensor, and a Faraday effect-based optical sensor.

20. A system for monitoring alternating current interference corrosion in a nearby underground metallic structure, the system comprising:

a test coupon adjacent to the underground metallic structure, and a non-destructive testing apparatus including an inductor, a magnetic property sensor, a computer system having a processor thereon, and a converter for coupling the sensor to the computer system, wherein the inductor induces an electric current in the test coupon, wherein the magnetic property sensor obtains a plurality of magnetic property measurements of the test coupon, wherein the converter converts the each of the plurality of magnetic property measurements into data for processing by the computer system, and wherein the computer system determines the amount of ferrimagnetic iron oxide from the data in the test coupon to derive the degree of alternating current interference corrosion of the test coupon in the underground metallic structure.

* * * * *